United States Patent [19]
Spash et al.

[11] 3,975,770
[45] Aug. 17, 1976

[54] TRANSDUCER ASSEMBLY FOR A DISC DRIVE

[75] Inventors: John L. Spash, Harvard; Robert Rottmayer, Littleton, both of Mass.

[73] Assignee: Digital Equipment Corporation, Maynard, Mass.

[22] Filed: Feb. 21, 1975

[21] Appl. No.: 551,798

[52] U.S. Cl. .............................. 360/103; 360/109
[51] Int. Cl.² .................. G11B 5/60; G11B 21/20; G11B 15/64; G11B 21/24
[58] Field of Search ............... 360/103, 104, 109

[56] References Cited
UNITED STATES PATENTS

| | | | |
|---|---|---|---|
| 3,177,495 | 4/1965 | Felts | 360/103 |
| 3,665,434 | 5/1972 | Applquist et al. | 360/103 |
| 3,678,482 | 7/1972 | Billawala | 360/103 |
| 3,792,492 | 2/1974 | Neace | 360/103 |
| 3,805,290 | 4/1974 | Thompson | 360/103 |
| 3,823,416 | 7/1974 | Warner | 360/103 |

*Primary Examiner*—Robert S. Tupper
*Attorney, Agent, or Firm*—Thomas C. Siekman

[57] ABSTRACT

A transducer assembly for a disc drive having an array of magnetic heads contained in a transducer device which, during operation of the disc drive, is maintained at the appropriate distance from a disc by an air bearing. The transducer device is secured to a flexible gimbal connected to a bracket. A pivot is located between the gimbal and bracket about which the transducer device may pivot to properly position itself in response to the air flow at the surface of the disc.

12 Claims, 4 Drawing Figures

TRANSDUCER ASSEMBLY FOR A DISC DRIVE

BACKGROUND OF THE INVENTION

This invention relates to a transducer assembly for a moving recording surface, e.g., a surface of a magnetic disc in a disc drive. More particularly, the invention relates to an assembly where a transducer device rides on and is positioned by an air bearing formed by the boundary layer of air that moves with the moving recording surface.

Data processing apparatus often contains equipment for reading, writing and storing data on units containing rotatable members such as discs or drums. The rotatable member has a magnetically coated surface which is selectively magnetized by a transducer located adjacent the surface. Data is read from the surface by one or more magnetic heads which provide an output as they pass over the surface. Similarly, data is written onto the magnetic surface by appropriately energizing the magnetic heads to magnetize the rotating surface appropriately.

It is now common to have magnetic heads which ride on an "air bearing" caused by the rotating surface. The disc or drum, as it rotates past the magnetic heads, produces an air flow which is used by the heads to cause them to float above the surface. This approach allows the magnetic heads to come very close to the rotating medium without actual contact.

The design of assemblies containing such magnetic heads is quite complex, and in general, such assemblies have been difficult and expensive to manufacture. The magnetic heads must have a certain degree of freedom since they float on the air bearing, yet the heads must be precisely positioned to access the appropriate data tracks on the magnetic surface. The heads must also respond to the air bearing in manner so that they stay at a constant distance above the magnetic surfaces. As the state of the art advances and the data is stored on magnetic surfaces with greater and greater density, magnetic head assemblies formerly used are no longer suitable.

SUMMARY OF THE INVENTION

According to the invention, a transducer assembly is provided for a moving recording surface and which has a transducer device that rides on an air bearing created by movement of the surface. The transducer device is provided with the necessary freedom to appropriately position itself with respect to the surface by being located on a flexible gimbal which is secured to a relatively stiff bracket and is pivotable about means located between the gimbal and bracket.

The distance between the pivot and the trailing edge of the air bearing surface of the transducer device is precisely determined by having the transducer device have an extending portion projecting through an aperture in the gimbal. The transducer device is secured to the gimbal by a plate spanning its aperture. The plate has a projection thereon and abuts a surface on the extending portion of the transducer device which is parallel to and located with respect to the trailing edge of the air bearing surface. The projection on the plate locates the pivot and, in this manner, the pivot is correctly located with respect to the trailing edge of the air-bearing surface.

To dampen movement of the transducer device in directions not along the direction of movement of the recording surface, the air-bearing surface of the transducer device has a plurality of grooves which extend essentially parallel to this direction.

Also, according to the invention, the transducer device is held in its position adjacent the recording surface by a pair of leaf springs cantileving from a support. The leaf springs are spanned by a spring member, also cantilevered from the support, and whose deflection is adjusted by a screw threaded through the support and contacting the spring member. This adjustment, forcing the spring member against the two leaf springs, allows the position of the head to be adjusted by deflecting the two leaf springs. With this approach, the two leaf springs are equally deflected and the transducer device is not titled.

Further, wires leading from the read/write magnetic cores in the transducer devices are connected to a terminal block on the bracket. This provides a short distance for the wires to extend, and consequently, their tendency of mechanical biasing the transducer device is minimized.

DETAILED DESCRIPTION OF THE PREFERRED EMBODIMENT

Figure 1:
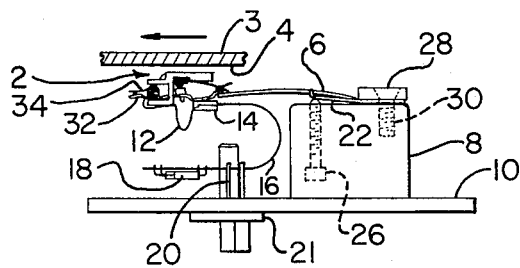
FIG. 1 is a side view of a transducer assembly according to the invention.

Referring to FIG. 1, a magnetic transducer device 2 is shown located adjacent to the bottom surface 4 of a rotating magentic disc 3 located within a disc drive. The disc's direction of movement with respect to the transducer assembly is shown in the drawing. The transducer device 2 has an air bearing surface which causes the transducer device to respond to the air flow traveling with the disc's bottom surface. In order to be able to respond appropriately, the magnetic transducer device is held with a certain degree, but not excessive amount, of freedom.

Briefly, the transducer device 2 is secured to a flexible gimbal 34 connected to a bracket 32 that is secured at the end of a pair of essentially parallel leaf springs 6 cantilevered from a support 8 projecting from a block 10. Screws 30 and plate 28 secure the leaf springs 6 to the support 8 and secure the position of the transducer device at the appropriate position along a line radial to the disc (perpendicular to the plane of FIG. 1). Sandwiched between the bottom of the leaf springs 6 and the top of the support 8 is another cantilevered leaf spring member 22 which spans the two leaf springs 6, contacting each of them. The position of leaf spring member 22, i.e. the amount of its deflection, is determined by an adjusting screw 26 which threads through support 8 to contact the member 22. By appropriately turning the screw 26, the leaf springs 6 are deflected.

Lead wires 12 run from a read/write magnetic core and coil assembly in the transducer device 2 to a terminal block 14 secured to the bracket 32. The terminal block has upper and lower portions, 14a and 14b (FIG. 2), which receive at one side the wires 12 and at their other side a flexible connector 16. The connector 16 is composed of a flexible plastic having coated electrical conductors thereon which electrically connect to the wires 12 in the block 14 and run to connectors 20. The two portions, 14a and 14b, of the block serve to sandwich the connector 16 and the wires 12 to maintain them in electrical contact. The connector 16 contains diodes 18 for electrical reasons unrelated to the invention. Through the connector 16, the proper voltages are transmitted to the read/write core and coil assembly in the transducer device for writing (i.e. recording) on the magnetic disc surface 4. Voltages induced in the read/write core and coil assembly when reading recorded information from the disc are transmitted by the wires 12, to the flexible connector 16, and to the connectors 20 for reading data from the disc.

Figure 2:
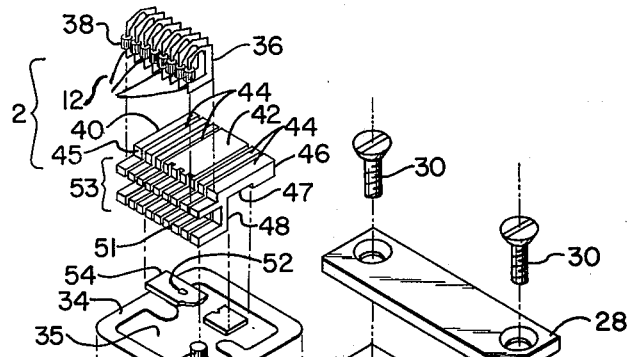
FIG. 2 is an exploded view of the assembly.
Figure 2:
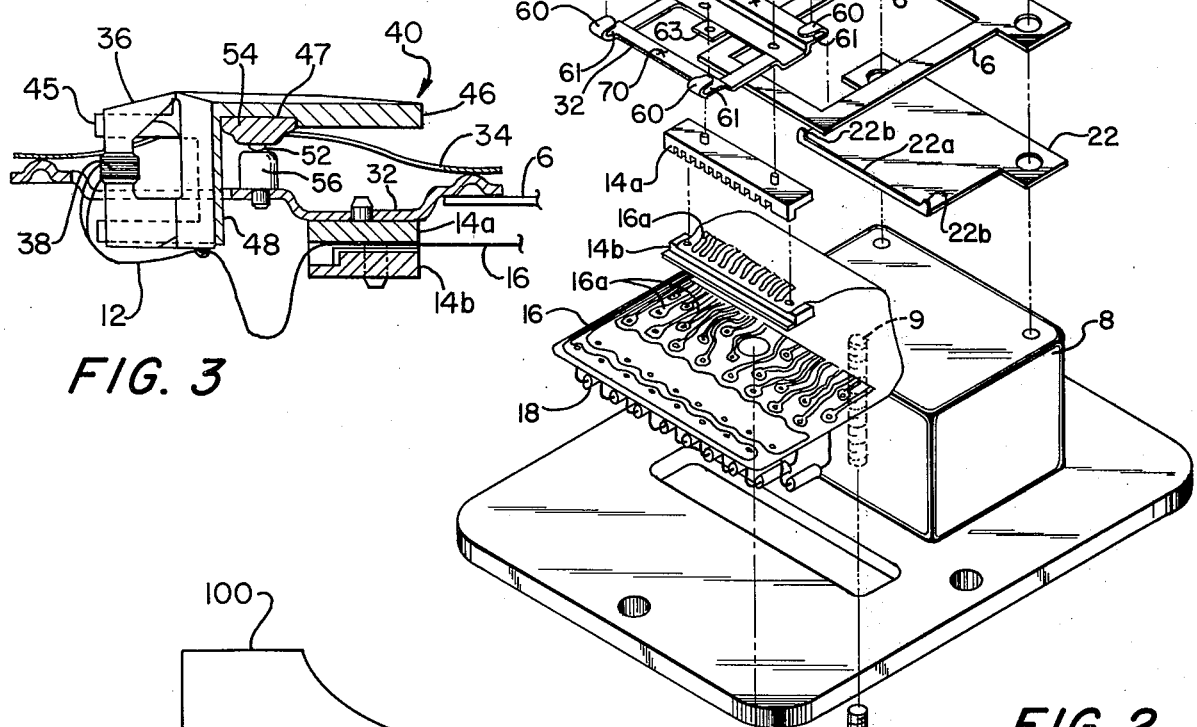

A better understanding of the transducer assembly may be obtained from the exploded view of FIG. 2. The transducer device 2 contains several (for example, eight) read/write magnetic cores 36 with coils 38 wound thereon and wires 12 coming from the coils. The cores are located within slots 51 in a slider pad 40. The slider pad has a surface 42 which is adapted to respond to the flow of air between the transducer device and the moving disc surface to properly position itself and, therefore, the read/write cores.

As shown in FIG. 2 the upper surface 42 of the slider pad facing the disc's surface has grooves 44 formed therein which are essentially parallel to the direction of movement of the moving disc surface. Air flow (caused by the moving disc) moves against and over the sides of the grooves and this air flow deters movement of the flexibly supported transducer device 2 in a direction perpendicular to the surface of the disc in response to small variations in the flow of air at the disc's surface. Consequently, the grooves serve to dampen such movement and thereby help to maintain the transducer device and its cores at a constant proper distance from the disc's surface.

Figure 3:
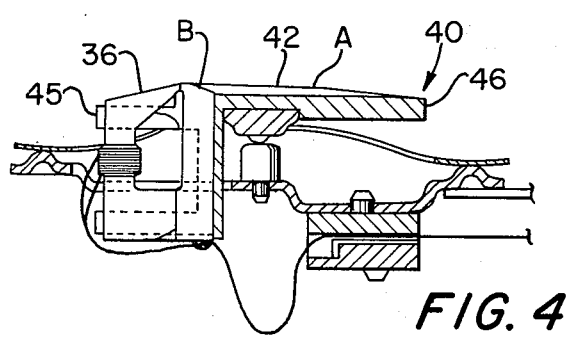
FIG. 3 is an enlarged sectional view of the assembly.

Referring to FIGS. 2 and 3, the slider pad 40 has a groove 47 formed therein which is adapted to tightly and precisely receive an elongated fulcrum plate 54. These two elements may be held together by epoxy adhesion or any means for joining the two elements together may be used. Each end of fulcrum plate 54 is welded to the gimbal 34.

As shown in FIGS. 2 and 3, the gimbal 34 essentially outlines the rectangular shape of the slider pad 40. It has an inner aperture 35 which the plate 54 spans. The slider pad 40 has a downwardly extending portion 53 which passes through the aperture 35 in the gimbal 34. The fulcrum plate 54 has a projection 52 (FIG. 3) formed in its center which contacts the end of a load pin 56 that projects from a tab 63 on the bracket 32. The bracket 32 has tabs at its four corners 60 which are bent over to form passages 61 for relatively loosely receiving the gimbal 34 at locations adjacent the trailing 45 and leading 46 portions of the slider pad 40. The bracket and gimbal may also be connected by a pair of spot welds respectively located adjacent to the middle of the trailing and leading (45, 46) portions of the slider pad at points 70 and 71 (FIG. 2) on the bracket.

The bracket 32, load pin 56, fulcrum plate 54 and gimbal 34 serve to hold the slider pad 40 and the read/write cores and coils with sufficient flexibility to ride on and be responsive to the air flow between the transducer and disc surface. The gimbal 34 is made of a flexible material and has a low spring rate (e.g., 0.16 gr.-in. per degree) while the bracket 32 is relatively stiff. Load pin 56, the projection 52 and the fulcrum plate 54 provide the slider pad 40 with a pivot (the load pin 56 and projection 52) about which it is allowed to move. The flexibility of the gimbal provides the appropriate degree of freedom for the slider pad to respond to the air bearing flow and move about its pivot. The tabs 60, holding the gimbal within their passages 61, limit the gimbal's roll deformation which may occur when the disc starts up and stops so that the gimbal does not contact the disc.

For the slider pad 40 to move properly in response to the air bearing, it must pivot about a point precisely located with respect to the trailing edge 45 of its surface 42. This is accomplished with the invention by having the projection 52, which locates the pivot point for the pad, formed in the plate 54 which abuts against a surface 48 of the downwardly extending portion 53 of the pad 40. Since the projection 52 may be easily, precisely located on the plate by well-known manufacturing procedures and since the surface 48 of the slider pad may be located with respect to the trailing edge 45 by well-known manufacturing methods when making the pad, the projection is easily and precisely located at the proper distance from the trailing edge.

Referring to FIGS. 1 and 2, the bracket 32 is welded to the pair of leaf springs 6 formed together in an integral piece 7. The member 7 is held to the support 8 by the plate 28 and screws 30. Beneath member 7 is another leaf spring member 22 which is sandwiched between piece 7 and the support 8. Member 22 is bent at 22a and has extensions 22b which respectively contact the two leaf springs 6 in piece 7. Support 8 has a threaded hole 9 which receives screw 26 which, as shown in FIG. 1, bears against spring member 22. By rotating the screw 26, member 22 is deflected to appropriately deflect both of its contacting leaf springs 6. This adjustment of deflection of the leaf springs 6 is used to position the transducer device 2 at its proper position from the disc surface. It also adjusts the force with which the load pin 56 (via the projection 52 and plate 54) pushes against the slider pad to counter the downward force exerted by the air bearing and keeps the transducer device at the proper distance from the disc surface.

The leaf springs 6, since they are spanned by member 22, are appropriately deflected equal amounts to position the transducer device 2 without tilting. During operation, the air force on the transducer device 2 causes the leaf springs 6 to deflect and with the leaf springs equally deflected, they equally share this force so that it does not cause the transducer device to roll or tilt.

The leaf springs 6 will deflect different amounts during operation of the disc since the portion of the transducer device 2 toward the center of the disc will have a lesser downward force exerted on it by the air bearing than will the other portion of the device located toward the circumference of the disc. The thinness and flexibility of the gimbal 34 isolates this difference in deflection of the leaf springs from the transducer device and allows it to respond to the air bearing without tilting but remaining substantially parallel to the disc's surface.

As shown in FIGS. 1, 2 and 3, the assembly includes a flexible connector 16 containing conductive portions 16a. One end of the connector 16 is interposed between two pieces 14a and 14b making up the terminal block 14. The terminal block 14 also receives the wires 12 coming from the coils in the transducer device 2. Connector pins 20 in a connector plate 21 project through holes in the connector strip 16 to contact the conductor portions 16a of the strip to electrically connect to the strip.

Unlike the wires in other transducer assemblies, the wires 12 only have a short length. The wires only extend from the transducer device 2 to the connector block 14 which is located on the bracket 32. This short length reduces the possibility of the wires being damaged by handling, as for example, during assembly. Also, the short distance between the pivot (formed by pin 56 and projection 52) and where the wires join the coils in the transducer device, minimizes biasing of the position of the pivotable transducer device by the spring force of the wires and there is very little tendency for the wires to effect the transducer device's response to the air bearing.

As has been seen, the invention provides a transducer assembly for a moving recording surface where the read/write device may be accurately positioned by the air bearing generated by the movement of the surface. The read/write transducer device within the assembly is provided with the necessary degree of freedom to accurately and appropriately position itself with respect to the moving surface yet is held with the appropriate restraint.

Figure 4:
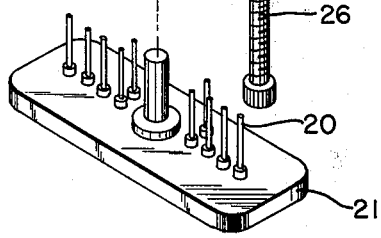
FIG. 4 is a view of the assembly showing the pressure curve which the transducer device creates in the air bearing.

FIG. 4 illustrates the transducer device and the pressure curve 100 which occurs at its air bearing surface while the disc is moving. As shown, the air bearing surface 42 of the slider pad 40 from its leading edge 46 rises at a constant shallow slope to a point A and then continues essentially flat and horizontal to point B, where it meets the cores 36. The distance between the leading edge 46 and point A is one-half the distance between the leading edge 46 and point B. The distance between the height of the surface 42 at the flat area between A and B and the surface at its leading edge 46 is four times the proper distance between the air bearing surface between A and B and the disc surface. With these factors, between points A and B on surface 42, the pressure curve is flat at a constant value. This flatness in the pressure curve in this area keeps the transducer device at a substantially constant distance from the disc surface.

When the disc stops moving and the air bearing terminates, the transducer device biased by leaf springs 6, contacts the disc's surface. The slope or taper of surface 42 between its leading edge 46 and point A creates an air flow which helps maintain device away from the disc as the disc slows. Similarly, when the transducer device is resting on a disc, which is just beginning to rotate, the taper of surface 42 assists the device away from the disc. Obviously, this feature of surface 42 lessens wear which may occur on the disc and transducer device during stopping and starting of the disc.

The assembly of the invention is also designed to be very light with very little mass and this characteristic also lessens wear of the disc and transducer device during stopping and starting of the disc. The lightness of the assembly also facilitates its response to the air bearing during operation.

It will be appreciated that various changes in the form and details of the above-described preferred embodiment may be effected by persons of ordinary skill in the art without departing from the true spirit and scope of the invention.

What is claimed is:

1. An air bearing transducer assembly for use with a moving recording surface comprising:

A. a slider with a transducer mounted thereon, said slider having an air bearing surface with leading and trailing edges, whereby movement of the recording surface relative to the slider generates an air bearing to support the transducer assembly, said slider having an extending portion substantially perpendicular to said recording surface with a surface parallel to said trailing edge; a gimbal having an aperture through which projects said extending portion and being flexible in a plane substantially parallel to the recording surface;

B. an elongated plate secured to the gimbal and extending across the gimbal's aperture, the plate being secured to said slider, abutting said surface of the extending portion and having a projection substantially perpendicular to said recording surface;

C. a bracket secured to the gimbal at locations adjacent the leading and trailing edges of the slider;

D. a pin, secured to the bracket, extending between the bracket and plate, having an end contacting the projection of the plate, and about which the slider may pivot; and E. means for supporting the bracket to position the slider adjacent the recording surface.

2. The assembly as recited in claim 1 wherein the slider has a plurality of grooves in its air bearing surface which extend substantially parallel to the direction of movement of the recording surface.

3. An air bearing transducer asssembly for use with a moving recording surface comprising:

A. a slider with a transducer, mounted thereon, said slider having an air bearing surface with leading and trailing edges, whereby movement of the recording surface relative to the slider generates an air bearing to support the transducer assembly;

B. a gimbal having an aperture and being flexible in a plane substantially parallel to the recording surface;

C. a plate secured to the gimbal and extending across the gimbal's aperture, the plate being secured to the slider;

D. a bracket secured to the gimbal at locations adjacent the leading and trailing edges of the air bearing surface;

E. pivot means extending between the bracket and plate and about which the transducer device may pivot; and F. means for supporting the bracket to position the air bearing surface adjacent the recording surface, said support means including a pair of leaf springs secured to opposite sides of the bracket, a member spanning the two leaf springs, a support from which the leaf springs cantilever, and means for adjusting the position of the member with respect to the support to deflect the leaf springs.

4. The assembly as recited in claim 3 wherein the two leaf springs are substantially parallel.

5. The assembly as recited in claim 4 wherein the spanning member is a left spring cantilevered from the support.

6. The assembly as recited in claim 5 wherein the adjusting means comprises a screw member threaded through a portion of the support to contact the spanning member.

7. An air bearing transducer assembly for use with a moving recording surface comprising:

A. a slider with a transducer mounted thereon, said slider having an air bearing surface with leading and trailing edges, whereby movement of the recording surface relative to the slider generates an air bearing to support the transducer assembly;

B. a gimbal having an aperture and being flexible in a plane substantially parallel to the recording surface;

C. a plate secured to the gimbal and extending across the gimbal's aperture, the plate being secured to the slider;

D. a bracket having two pairs of projections, the pairs being respectively adjacent the trailing and leading edges of the transducer device, the projections having passages which receive edges of the gimbal;

E. pivot means extending between the bracket and plate and about which the transducer device may pivot; and F. means for supporting the bracket to position the slider adjacent the recording surface.

8. The assembly as recited in claim 7 wherein the projections are tabs bent to form the passages.

9. The assembly as recited in claim 7 wherein the bracket and gimbal are further connected by a pair of spot welds, respectively located adjacent to the substantially the middle of the trailing and leading edges of the slider.

10. The assembly as recited in claim 7 wherein the gimbal has a low spring rate.

11. An air bearing transducer assembly for use with a moving recording surface comprising:

A. a slider with a transducer mounted thereon, said slider having an air bearing surface with leading and trailing edges, whereby movement of the recording surface relative to the slider generates an air bearing to support the transducer assembly;

B. a gimbal having an aperture and being flexible in a plane substantially parallel to the recording surface;

C. a plate secured to the gimbal and extending across the gimbal's aperture, the plate being secured to the slider;

D. a bracket secured to the gimbal at locations adjacent the leading and trailing edges of the slider;

E. pivot means extending between the bracket and plate and about which the slider may pivot;

F. means for supporting the bracket to position the slider adjacent the recording surface;

G. a terminal block secured to the bracket;

H. lead wires connected to the slider at a short distance from the pivot means, the lead wires leading from the slider to the terminal block; and I. a flexible cable extending to the terminal block and electrically connected within the block to the wires.

12. An air bearing transducer assembly for use with a moving recording surface comprising:

A. a slider with a transducer mounted thereon, said slider having an air bearing surface with leading and trailing edges, whereby movement of the recording surface relative to the slider generates an air bearing to support the transducer assembly, the air bearing surface having a portion adjacent its leading edge which slopes toward the leading edge as a constant rate away from the recording surface, the remaining portion of the air bearing surface being essentially flat and horizontal, the sloped portion of the air bearing surface having a horizontal distance essentially equal to the length of the remaining horizontal portion of the air bearing surface, and when the recording surface is moving, the pressure curve above the air bearing surface adjacent the flat and horizontal portion of the air bearing surface being substantially parallel to said portion, and the pressure curve adjacent the sloping portion of the air bearing surface decreasing from said flat and horizontal portion of the curve;

B. a gimbal having an aperture and being flexible in a plane substantially parallel to the recording surface;

C. a plate secured to the gimbal and extending across the gimbal's aperture, the plate being secured to the slider;

D. a bracket secured to the gimbal at locations adjacent the leading and trailing edges of the slider;

E. pivot means extending between the bracket and plate and about which the slider may pivot; and F. means for supporting the bracket to position the slider adjacent the recording surfaces.

* * * * *